United States Patent [19]

Henderson

[11] 4,031,959
[45] June 28, 1977

[54] METHOD OF MAINTAINING THE PERMEABILITY OF HYDROCARBON RESERVOIR ROCK

[75] Inventor: James H. Henderson, Dallas, Tex.

[73] Assignee: Permeator Corporation, Houston, Tex.

[22] Filed: July 7, 1976

[21] Appl. No.: 703,216

Related U.S. Application Data

[63] Continuation-in-part of Ser. No. 647,769, Jan. 9, 1976, abandoned, which is a continuation of Ser. No. 542,297, Jan. 20, 1975, abandoned.

[52] U.S. Cl. .............................. 166/307; 166/278; 166/294; 166/299; 166/308
[51] Int. Cl.$^2$ ................. E21B 43/04; E21B 43/26; E21B 43/27
[58] Field of Search ............... 166/305 R, 307, 308, 166/247, 299, 278, 305 D, 294, 292; 175/72

[56] References Cited

UNITED STATES PATENTS

| | | | |
|---|---|---|---|
| 2,782,859 | 2/1957 | Garst | 166/305 R |
| 2,896,915 | 7/1959 | Weiss et al. | 175/72 |
| 2,955,653 | 10/1960 | Cain | 166/292 X |
| 3,208,528 | 9/1965 | Elliott et al. | 166/305 R |
| 3,382,924 | 5/1968 | Veley et al. | 166/305 R |
| 3,603,399 | 9/1971 | Reed | 166/305 R |
| 3,692,125 | 9/1972 | Ruhle | 175/72 |
| 3,710,863 | 1/1973 | Webster et al. | 166/305 R X |
| 3,729,052 | 4/1973 | Caldwell | 166/292 X |
| 3,741,308 | 6/1973 | Veley | 166/292 |
| 3,843,524 | 10/1974 | Perricone et al. | 166/305 R X |

*Primary Examiner*—Stephen J. Novosad
*Attorney, Agent, or Firm*—Toren, McGeady and Stanger

[57] ABSTRACT

In the disclosed method, an aqueous solution of alkaline earth metal hydroxides and a salt of an alkaline earth metal is injected down a well bore and into a hydrocarbon reservoir in volume quantities sufficient to fill the pore spaces of said reservoir to some distance from the well bore. The concentration of the alkaline earth metal cations is greater than 10,000 ppm and the pH of the aqueous solution is greater than 10. The solution is forced under pressure out into the subterranean reservoir for a time period which is insufficient to consolidate sand but which is sufficient to permanently alter the properties of indigenous, intergranular clay sized particles and thereby achieve desirable permeability effects in certain fluid sensitive reservoirs. After a sufficient time period has elapsed, the well head pressure is released thereby allowing the solution to flow back into the well bore. Hydrocarbon productivity from water sensitive and low-permeable ("tight") reservoirs is improved by this method of permanently altering intergranular clays to prevent permeability reductions caused by clay migration or clay expansion.

11 Claims, 4 Drawing Figures

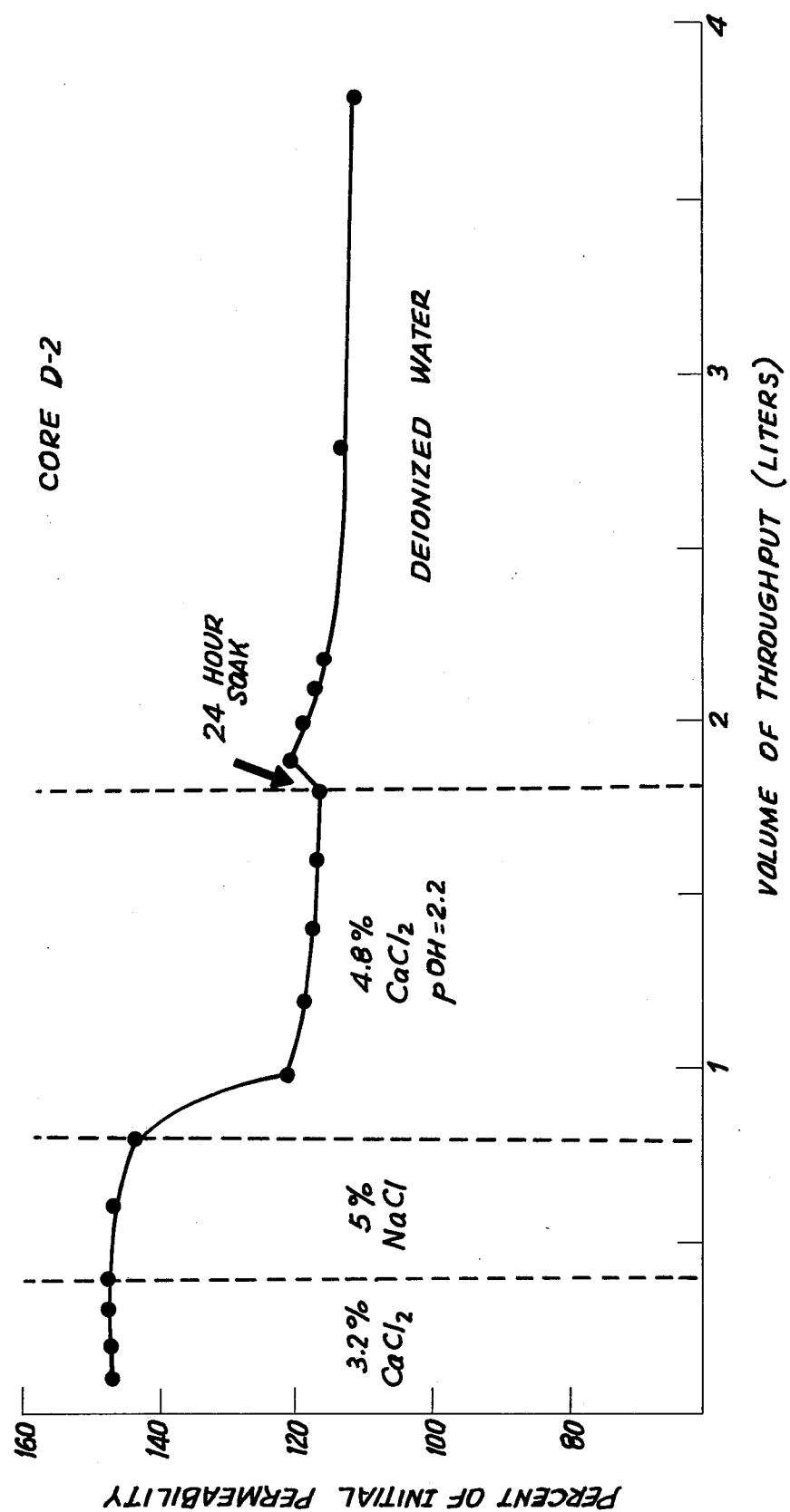

METHOD OF MAINTAINING THE PERMEABILITY OF HYDROCARBON RESERVOIR ROCK

CROSS-REFERENCE TO PRIOR APPLICATIONS

This application is a continuation-in-part of my copending application Ser. No. 647,769 filed Jan. 9, 1976, which, in turn, was a continuation of Ser. No. 542,297 filed Jan. 20, 1975, and now abandoned.

REFERENCES CITED
STATES PATENTS

| | | |
|---|---|---|
| 2,782,859 | 2-57 | Garst |
| 2,841,222 | 7-58 | Smith |
| 2,896,915 | 7-59 | Weiss et al. |
| 2,941,597 | 6-60 | O'Brien |
| 2,955,653 | 10-60 | Cain |
| 3,208,528 | 9-65 | Elliott and Jones |
| 3,422,890 | 11-69 | Darley |
| 3,483,923 | 12-69 | Darley |
| 3,578,781 | 5-71 | Abrams et al. |
| 3,603,399 | 9-71 | Reed |
| 3,640,343 | 2-72 | Darley |
| 3,675,716 | 7-72 | Farmer and Lawson |
| 3,679,001 | 7-72 | Hill |
| 3,692,125 | 9-72 | Ruhle |
| 3,729,052 | 4-73 | Caldwell |
| 3,741,308 | 6-73 | Veley |
| 3,746,109 | 7-73 | Darley |
| 3,843,524 | 10-74 | Perricone et al. |

OTHER REFERENCES

Chenevert, M.E., Shale alteration by water adsorption. In Jour. Petroleum Technology, Vol. 22, September 1970, pp. 1141–1148.

Gray, G.R., Neznayko, M., and Gilkeson, P. W., Solidification of lime treatedmuds at high temperatures. In World Oil, March 1952, pp. 101–106.

van Olphen, H. An Introduction to Clay Colloid Chemistry, 1963, Interscience Publishers, New York, p. 301.

FIELD OF INVENTION

The invention is directed to a method for maintaining, stabilizing, and — if clay damage has occurred — of improving the permeability of porous hydrocarbon reservoirs which contain intergranular clay-sized components. The inventive method involves chemical reactions with the argillaceous and aranaceous clay-sized particles existing in porous subterranean rocks. The invention is useful in improving primary or secondary or tertiary recovery of hydrocarbons from several lithologically distinct reservoir types.

BACKGROUND INFORMATION

Permeability is the most important single property of a hydrocarbon reservoir rock. Rock properties which influence permeability include particle size, particle packing, particle size distribution, grain angularity, and the degree of lithification (cementation and consolidation). The permeability of a reservoir rock, usually expressed in "millidarcys", may be defined as the fluid conductivity within the interconnected porework of a porous media. Specific permeability of a porous media refers to a permeability measured with a single fluid at 100% saturation of that fluid present in the pore spaces. The effective permeability of a porous media applies to the permeability of each phase at a specified saturation when two or more phases are present in the pore spaces. Effective permeabilities are always lower than specific permeabilities because the presence of other phases inhibits the ability of a specific phase to flow.

The permeability of a reservoir rock is susceptible to two distinct types of damage. One type of damage is caused by the expansion and/or migration of clay particles and a second type of permeability damage is caused by specific and particular hydrocarbon production practices which are independent of the mineralogy and texture of the rock. Permeability damage around a well bore will lower the productivity of completed wells. In secondary or tertiary recovery processes, permeability maintenance through reservoir clay control can means the difference between economic success or failure.

The term clay is used as a rock term and as a particle size term. As a particle size term clay refers to particles having an equivalent Stokes diameter of less than two microns. As a rock term, the term clay mineral refers to silicate minerals with a crystal structure of the two layer type (e.g. kaolinite) of the three layer type (e.g. montmorillonite) in which silicone has a tetrahedral coordination with respect to oxygen (i.e. the tetrahedral layer) while aluminum, iron, magnesium, manganese and other such ions have octahedral coordination with respect to oxygen (i.e. the octahedral layer.) Exchangeable cations may exist in thermal motion on the surfaces of the silicate layers in an equivalent amount as determined by the excess negative charge existing within each composite layer. For the purposes of this invention, the term clay is deemed to include both rock and particle size meanings.

The kind of ion (either exchangeable cation or anion) and the distance of the ion from the clay surface greatly influences the behavior of clay colloids. The higher the charge of a cation the greater the tenacity with which it is adsorbed on a clay particle. Sodium ion relative to calcium ion (with a positive charge of 2) is held by the clay with less bonding energy partially accounting for clay damage in reservoirs containing sodium chloride brines whose concentration changes with reservoir fluid changes.

The behavior of clay colloids in fluid environments is most often explained and predicated on the basis of the electrical double layer, which consists of the surface particle charge of the clay and an equivalent amount of ionic charge which is accumulated in the liquid near the particle surface. The thickness of the double layer depends upon the concentration and charge of electrolytes in the solution surrounding the clay particle. In order to maintain the permeability of the reservoir rock, it is desirable to suppress the thickness of the double layer and allow two negatively charged particles to come in close proximity.

High concentrations of electrolytes in the fluids such as sodium chloride brines will depress the thickness of the electrical double layer but as the concentration of salt in the fluid decreases the double layer expands causing the undesirable expansion of layers and movement of the clay particles. The first stages of clay expansion can involve pressures of up to 60,000 psi (van Olphen, 1963). Prevention of such pressures as accomplished in this invention is a significant factor in controlling the permeability and structural competence of reservoirs lithified by clay cements.

The term shale refers to a sedimentary rock composed primarily of clay minerals such as chlorite, kaolinite, mica, illite, montmorillonite, etc., which have particle size diameters of less than two microns. Shale is not considered to be a porous hydrocarbon reservoir rock and is not the type of rock to be treated by the inventive method.

Many hydrocarbon bearing formations contain relatively thin zones of sands (with porosity development and hydrocarbon saturation) separated by shale streaks. The thin zones contain in addition to quartz and feldspar minerals, varying percentages of less than two micron in diameter clay minerals which partially accounts for the natural low permeability because the clay-sized minerals tend to block flow channels. For example, the natural permeability of such "tight" formations may be less than one millidarcy and the porosity may be less than 10%. In order to produce hydrocarbons from such rocks it is desirable to propagate vertical and or horizontal fractures to interconnect the thin zones of sand and some cases to extend the fractures as far as 4000 feet on either side of the well bore. One such method of creating artificial fissures and thereby increasing the pore space and permeability is known as hydraulic fracturing stimulation. Such a stimulation involves injecting a fluid under pressure down a well bore and into a hydrocarbon bearing formation in order to overcome native rock stress and to cause material failure (fracture) of the porous media. Many such stimulation attempts have been unsuccessful because the clay sized components are pushed to the furthermost extremities of the artificial fissures and upon placing the well on production, the clay attempt to migrate to the well bore and eventually become restricted damaging permeability and well productivity. In addition to migration, clays existing within the reservoir rock may adsorb water or other fluids and expand to block flow channels. Because of the abundance of clay-sized particles in many "tight" reservoirs, adequate clay control is a foremost consideration in selecting a fluid for use in stimulation treatments.

Reservoir rocks younger in age than Cretaceous are commonly unconsolidated or semiconsolidated. Improper well completion or production techniques frequently result in damage to the intergranular clay components which serve as lithifying agents. Such clay damage creates stress in the rock and causes it to become incompetent around the well bore. Movement of large sand sized particles and rearrangement of the pore geometry causes serious reductions in permeability. Acid treatment to dissolve clays usually results in further intrusion of clay sized particles ("formation fines") and even greater reductions in permeability. Furthermore, regular mud acid (i.e. a mixture of hydrochloric and hydrofluoric) can dissolve clays only within a few inches of the well bore. A method of formation control through permeability maintenance and clay control as taught in this inventive method is needed in conjunction with acid stimulation of many reservoir rocks.

Although the inventive method is useful in maintaining the permeability of porous rocks in general, it is particularly applicable to and thus will be primarily described in connection with the improvement of hydrocarbon recovery through the stabilization and the maintenance of the permeability of porous rocks encountered in the production of oil and gas.

PRIOR ART

The present invention is, at least in part, premised on the discovery that solutions of alkaline earth metal hydroxides and alkaline earth metal salts may be formulated in such proportions that when such a solution is placed in contact with a porous media containing intergranular clay-sized particles an overall permeability stabilization or improvement of the porous media occurs. Such a permeability improvement may be partially explained by the fact that the disclosed solution depresses the thickness of the hydrous electrical double layer which exists at the solid interface and that such a depression of the electrical double layer is immediately followed by chemical alteration of clay sized particles into non-migratory hydrated alkaline earth metal silicates which adhere to the surfaces of sand particles composing the matrix of the porous rock. The purpose of the following discussion of the prior art is to demonstrate how the present inventive method departs from the conventional and how much departure causes some significant changes in operation and results.

Elliott and Jones (U.S. Pat. No. 3,208,528) provide for a method of partially correcting permeability reductions due to clay blocking in water sensitive reservoirs that have connate waters containing at least 5% by weight divalent cations of total dissolved solids. The method of Elliott and Jones calls for: (a) injecting into said formation a liquid having a salinity of not more than 15,000 ppm of which at least 5% of the dissolved solids in the injected liquid are salts of divalent cations; (b) injecting such a solution into a water-sensitive formation in an amount corresponding to at least 0.5 gallon per linear foot of formation interval; (c) repeating the injections a plurality of times under the aforesaid conditions while reducing the dissolved solids concentration but maintaining the salts of divalent cations at the 5% level; (d) continuing the repetitive injection cycle until the liquid being injected has been reduced to the desired degree of dilution with respect to the dissolved solids contained in the reservoir connate water. The inventive method of Elliott and Jones is clearly directed toward reservoir conditioning for water-flood operations wherein large volumes of brine water are used to push and recover oil. Usage of fluid compositions as taught by Jones and Elliott could only result in a cation exchange reaction with the clay minerals. As such, the method could at best only achieve a temporary and non-permanent alleviation of the clay blocking problem.

The present inventive method is distinctly different from the teachings of Elliott and Jones as in the present method replacement of the exchangeable cations with alkaline earth metal cations is immediately followed by chemical reaction with the clay to form a reaction product of hydrous calcium silicates. Besides the differences in solution chemistry between the present inventive method and that of Elliott and Jones, in the present inventive method there are no restrictions on the cationic composition of the reservoir connate water nor are a plurality of injections down the well bore required.

A method for maintaining a true bore hole when drilling through "heaving" shales through the use of an inventive drilling mud is disclosed by the teachings of Weiss, Graves and Hall (U.S. Pat. No. 2,896,915). The method of Weiss et al. calls for dispersal of drilling mud (usually a montmorillonite type clay) in an alkaline aqueous filtrate phase. The aqueous filtrate phase being described as saturated with respect to calcium hydroxide and containing a co-existing water soluble calcium salt which has a solubility in water greater than the solubility of calcium hydroxide and sufficient to yield a calcium ion concentration in the range of from 300 to 1000 ppm and with the overall pH of the filtrate phase not exceeding a value of 12.6. The present inventive method is distinct from the art of Weiss et al. in that the present inventive method is not directed toward preparation of drilling mud fluids which are suitable for use in controlling heaving or problem shales often encountered during the drilling operations. Furthermore the blending of drilling mud into an aqueous filtrate phase as specified by Weiss et al. to provide a stable dispersion of colloid particles suitable of removing cuttings from the well bore is contrary to the object of the present inventive method which coagulates and alters the intergranular clay particles of porous reservoir rocks. High pH line base muds which repress dispersion and hydration of shale cuttings carried in the drilling mud have been in use for many years. (Gray et al., 1952).

Abbott (U.S. Pat. No. 3,008,818) teaches the use of a "Well Completion and Workover Fluid" for the inhibition of the "hydration of shaley material or bentonitic type material in contact therewith, but which also tends to solidify and harden those materials and render these materials more competent". Abbott's fluid consists of a solution saturated with calcium hydroxide, a water soluble calcium salt in an amount sufficient to yield a total calcium ion concentration in excess of 200 but below 2000 parts per million by weight and a compatible water solution alkali metal compound in a substantial amount up to the point of saturation. As quoted from Abbott " . . . said fluid being effective to solidify and harden shaley and bentonitic type of material in contact therewith in spite of the alkali metal concentration thereof". Abbott's teachings are supported by very limited experimental results concerning compressive and tensile strengths of the desired hardened shale and the time and temperatures required to achieve the hardened state. In fact, Abbott's teaching of injecting solutions containing water soluble alkali metals in great excess over the alkaline earth metal calcium into water sensitive formations is clearly undesirable from a permeability maintenance point of view. Clays containing alkali metal cations on the exchange sites have been conclusively proved to be water sensitive.

Cain (U.S. Pat. No. 2,955,653) discloses a procedure related to the use of a carrier liquid for gravel packing operations. Cain states "Gravel packing is employed to maintain or stabilize incompetent formations and/or to maintain productivity of a producing well which otherwise might sand-up with resulting diminished productivity". The fluid composition disclosed by Cain is " . . . an alkaline aqueous solution having a pH not in excess of 12.6, said solution being saturated with respect to calcium hydroxide and containing a calcium ion concentration in excess of 200 part per million by weight based on said solution". Cain alleges that " . . . hydratable shaley materials, such as so-called heaving shales, upon contact with an alkaline aqueous solution having the characteristics above described are not only prevented from swelling and disintegrating but also undergo hardening and are transformed after a period of time, about 24 to 168 hours depending upon the temperature, higher temperatures accelerating the process, into a cement-like or rock-like material". The patentee clearly did not consider the fact that shale bodies compacted by geological processes have such low permeability that the process described by the patentee would be unworkable. Cain's statements are themselves contradictory as he alleges that "the employment of an aqueous mud which contains finely divided hydratable clay dispersed and suspended in the aqueous phase thereof as the carrier liquid in a gravel packing operation is possible in accordance with the practice of this invention provided the aqueous or filtrate phase of the drilling mud meets the requirement as set forth herein". It is obvious that Cain's fluid cannot be used to keep clays suspended in a dispersed state on the one hand and, on the other hand, to be used to transform clays into a "cement-like" or "rock-like" material.

Darley (U.S. Pat. No. 3,746,109) described the use of a low viscosity aqueous drilling fluid of low solids content for use in drilling operations to stabilize shales. The drilling fluid described by Darley consisting of sodium silicate and sufficient dissolved salt to provide a total solute concentration sufficient to inhibit the transference of water into the shale pores. In a previous invention, Darley (U.S. Pat. No. 3,640,343) described a method for the stabilization of hard shaley earth formations which involved the use of an alkali metal silicate solution in the pH range of from about 11 to about 12.

Valey (U.S. Pat. No. 3,741,308) describes a process for the consolidation of loose sand (i.e. incompetent sand formations) by a method of passing an aqueous solution of calcium hydroxide through the sand. Valey's invention requires the use of a minimum of 4.0 grams of calcium hydroxide per liter of pore volume in the sand body. In addition, the temperature of the formation has to be in excess of 130° F and a certain minimum reaction period ranging up to 350 hours is required for consolidation of loose sand.

Caldwell (U.S. Pat. No. 3,729,052) also describes a procedure wherein loose or unconsolidated sand, present in sub-surface formations, is transformed into a consolidated, permeable mass of siliceous material. Caldwell's inventions relates to the use of a solution of alkaline earth hydroxide. Caldwell's method calls for the exertion or maintenenace of pressure on the solution following injection and a quiescent period of contact for the reaction to occur. This patentee claims " . . . to maintain a quiescent contact between said solution and said finely divided particles for a sufficient time under the temperature conditions within the formation to enlarge the finely divided siliceous particles through surface reaction with the aqueous solution to increase their agglomerated volume in the order of 2:1 or greater". Such volume changes described by this patentee would decrease porosity and permeability and are thus undesirable. Volume changes of 100% as claimed by patentee would reduce porosity and permeability and would create stress within the formation that could collapse the well bore. For example, a firm textured sub-surface shale sample from the Gulf of Mexico was determined by Chenevert (1970) to have a density of 2.27 and a water content of 11% by weight. An increase in the water adsorption to 41% by weight resulted in a decrease in density to 1.62 and also in the texture becoming "soft". Such a density change indicates a volume of expansion of about 1.4:1, less than the 2:1 claimed by Caldwell. Such volume and texture changes would decrease permeability and the stability of the formation.

Reed in U.S. Pat. No. 3,603,399 teaches a method of treating a water sensitive formation penetrated by a well by injecting down a well and contacting a water sensitive formation with a hydroxy-aluminum solution having a ratio of hydroxyl groups to aluminum atoms in the range of from 1.5 to 2.7. Adsorption of such polynuclear aluminum polymers on a clay surface tend to make clays non-expansible or non-hydratable. Theoretically, this method is of little benefit on non-expansible clays, such as kaolinite, which have a small cation exchange capacity but a propensity to migrate and plug flow channels.

Garst (U.S. Pat. No. 2,782,859) describes a method for improving the permeability for flow of oil or water of earthen formations in which pores are partially plugged by hydrated clays. The method of Garst involves "shrinking" the total volume of clay water systems through chemical treatment with an acid to saturate the cation exchange sites with hydrogen followed by replacement of exchangeable hydrogen with a metal cation having a diameter of greater than 2.69 angstroms.

Darley in U.S. Pat. No. 3,483,923 describes a process of improving and stabilizing the effective permeability of subterranean formations for the purpose of improved hydrocarbon recovery. This process of Darley's involved acidization of the formation followed by injection of an oil-wetting emulsion capable of oil-wetting the grains of the formation. In U.S. Pat. No. 3,422,890, Darley discloses a method for the prevention of clay swelling and thus an improvement in the permeability of earthen formations for the purpose of improved hydrocarbon recovery in water flood operations. This disclosure also teaches the art of oil wetting formation particles through treatment with oil in water emulsions.

Additional prior art is also exemplified by the following U.S. Pat. Nos.: Smith, 2,841,222; O'Brien, 2,941,597; Abrams et al., 3,578,781; Farmer et al., 3,675,716; Hill, 3,679,001; Ruhle, 3,692,125, Perricone et al., 3,843,524.

OBJECT OF INVENTION

It is a primary object of this invention to provide for improved hydrocarbon recovery from subterranean reservoirs containing intergranular clay-sized particles through a procedure which maintains, stabilizes and improves permeability to the flow of fluids such as oil, gas and water and/or mixtures thereof.

It is also an object of this invention to provide for a method of transforming the intragranular clay components of porous hydrocarbom reservoirs into a state wherein said clay components are rendered non-expansible and non-migratory (i.e. capable of adhering to the ambient rock sub-strata) and consequently incapable of plugging flow channels.

Still another object of this invention is to provide a method of fracturing "tight" hydrocarbon reservoirs through the use of a procedure wherein clay-sized particles are chemically transformed into a non-migratory state and therein do not flow towards the well bore with the hydrocarbon phases within induced flow channels or fractures artificially created by hydraulic, explosive, nuclear or long-burn gas release techniques.

Still another object of this invention is to provide for a method which may be used in combination with other formation sand-control techniques such as plastic sand consolidation treatments, gravel packs, slotted liners, screens, etc., to render incompetent formations (due to unconsolidated sand) more competent through the selective alteration of the intergranular clay sized compenents.

Another object of this invention is to provide for a method of treating hydrocarbon reservoirs following acid treatments to inhibit the commonly observed migration of intergranular clay-sized particles (i.e. "formation fines") towards the well bore and the consequent blocking of flow channels.

Yet another object of this invention is to provide for a method of maintaining or enhancing the fluid receptivity of subterranean porous rocks which are used for waste disposal, water disposal, or hydrocarbon storage through alteration of indigenous intergrannular clay components.

It is not an object of this invention to consolidate sand in the formation. It is not an object of this invention to stabilize heaving shales often encountered during drilling operations.

SUMMARY OF INVENTION

The present invention is, at least in part, premised on the discovery that the permeability of a porous rock containing intergranular clay particles may be maintained and stabilized to the subsequent flow of hydrocarbon phases by treating the rock with an aqueous solution containing alkaline earth metal salts and alkaline earth metal hydroxides. The improved fluid conductivity behavior is attributed to a beneficial cation exchange process and to a chemical alteration which transforms the clays into hydrous alkaline earth metal silicates.

DETAILED DESCRIPTION OF THE INVENTION

Briefly and in accordance with this invention, the above objects are superiorly attained by injecting down a well bore and passing through a permeable reservoir rock an aqueous solution of alkaline earth metal hydroxide and a soluble salt of an alkaline earth metal cation. The pH value of the solution should be greater than 10 and the concentration of alkaline earth metal cations should be at least 10,000 ppm and in some cases to be limited by the maximum solubility of alkaline earth metal salts in water. The exact composition of the solution injected, the injection rate, and other treatment parameters are determined by and dependent upon the nature and the condition of the well and or reservoir rock being treated. Although the inventive solution may be preheated, elevated fluid temperatures are not required to achieve the desired effects. The rate of reaction of the fluid with the clay particles in the subterranean porous rock is sufficiently rapid that only a one hour shut-in period of contact is normally required. However, longer periods of fluid contact with the formation are not detrimental regarding the intended results as taught in this invention.

The alkaline earth metals suitable for use in this inventive method is specifically limited to calcium, barium, strontium and magnesium. Two additional alkaline earth metals, radium and beryllium, are not suitable because of their unique properties. Although magnesium compounds may be used, the pH of magnesium hydroxide brine solutions is sometimes too low to achieve the objects of this invention. A barium hydroxide solution may be preferred in the treatment of reservoirs having temperatures in the range of 250° F to 300° F, or greater, and in reservoirs having an intergranular clay content of more than 10% by weight. The criteria being that the reaction rate of barium hydroxide brine solutions with clay particles is slower which therefore allows a more uniform permeability maintenance treatment of the reservoir rock at greater distances from the well bore.

Salts suitable for preparation of the solution of alkaline earth metal hydroxide and alkaline earth metal salts include, calcium chloride, calcium bromide, calcium iodide, strontium chloride and others. Economic factors, product availability and effectiveness make an aqueous solution of calcium hydroxide and calcium chloride the preferred system of alkaline earth metal hydroxide and salt. Without wanting to be limited to any theories, it is believed that the formation of complex ions such as $[Ca(OH) \cdot 5H_2O]+$, and $[CaCl \cdot 5H_2O]+$ as dissolved ionic species increases the effective concentration of uncomplexed calcium and hydroxide ions in a manner which increases the rate and extent of formation of the desired reaction products described as hydrous calcium silicates. The adhesive properties of hydrous calcium secures their location on rock substrates and prevents particle migration with flowing fluid.

The preferable inventive method, but not as a limitation of this invention, of preparing an aqueous solution of calcium chloride and calcium hydroxide is as follows:

A. Prepare a 32% by weight solution of calcium chloride by dissolving approximately 196 pounds of a 95% purity calcium chloride salt in 50 gallons of water.

B. In a separate container, prepare a 7.25% solution of sodium hydroxide by adding 0.5 gallons of a 50% by weight solution of sodium hydroxide to 4.5 gallons of water.

C. Add the resultant 5 gallons of 7.25% sodium hydroxide to the 32% by weight solution of calcium chloride while agitating with nitrogen gas to obtain a solids-free solution.

D. Dilute the resultant calcium hydroxide brine solution at the well site with fresh water for injection into the formation. The amount of dilution at the well site is determined by several parameters, but in many instances is at the rate of 55 gallons of calcium hydroxide-calcium chloride brine solution to 252 gallons of fresh water.

The fact that steps A through D above can be carried out to obtain a high pH solution of calcium hydroxide and calcium chloride, is unexpected, significant and an integral part of this inventive method.

Other methods of preparing an aqueous brine solution of calcium hydroxide and calcium chloride include dissolving lime in a solution of calcium chloride and another method is by reacting hydrochloric acid with calcium hydroxide or calcium oxide or calcium carbonate. Techniques for preparing brine solutions of barium hydroxide or magnesium hydroxide or strontium hydroxide are similar and will be apparent to those skilled in the art.

The exact volume and concentration of the solution injected into the formation is dependent upon the nature and condition of the reservoir being treated. A typical treatment, but not as a limitation on this invention, might be to inject five barrels of the fluid diluted as described in step D (above) per foot of perforated interval or per foot of "pay" zone. If the reservoir rock contains intergranular clay nodules, lumps or laminae, the pores within the clay aggregates contain water which has a chemical ionic activity similar to a concentrated aqueous electrolyte solution and the solution as prepared in step C (above) would be injected undiluted with fresh water into the rock to control water diffusion. High concentrations of 300,000 to 400,000 ppm by weight of calcium chloride at a pH of about 11 may be necessary to alter the clays as desired in this inventive method in reservoir rocks containing clay aggregates.

Normally one pore volume of the alkaline earth hydroxide brine solution will protect the permeability of a like volume of pore space. Permeability maintenance over a radial distance of not more than 5 feet from the well bore is generally sufficient for satisfactory well productivity.

Stimulation of a tight reservoir by the hydraulic fracturing technique using this inventive method might typically involve the injection of 100 barrels per foot of perforated interval of a 2% by weight solution of calcium chloride adjusted as previously described to a pH of 11 at a pressure sufficient to cause material failure of the reservoir rock. Suitable and chemically compatible viscosity modifiers (gelling agents), fluid friction reducing agents, liquid surface tension reducing agents (surfactants) and propping agents may be incorporated in the inventive method to render a more effective stimulation. The usage of such additives is common in the hydraulic fracturing art.

The first phase of the reaction involves an almost instantaneous exchange of calcium (or other alkaline earth metal) for the naturally occurring exchangeable cations. The anion exchange sites of the clays also become saturated with combinations of hydroxyl and chloride ions. Although changing the electrical characteristics of clay components of the reservoir rock through ion exchange processes provides an immediate permeability benefit, permanent improvement requires further chemical changes in the crystal structure and properties of the clay colloids. Changes in the composition and crystallinity of the clay is accomplished in the method taught by this invention. In high pH solutions such as pH 10 or greater, the silica in the tetrahedral layer is unstable and decomposes. In the presence of calcium or other alkaline earth metals, the dissolved silica is chemically combined with the alkaline earth metals to form stable, insoluble and non-expandable calcium silicate hydrates. Both water sensitive and non-water sensitive clays are transferred into hydrated calcium silicates which have either a crystalline or amorphous structure. Several structural types of hydrated calcium silicates exist and no definite chemical composition is proposed. The alumina existing in the octahedral layer of the indigenous clays may also be transformed into various calcium aluminates or in the presence of silica, calcium alumino-silicates. Most of the alkaline earth metals form insoluble alumino-silicates.

The practice of this invention which results in the formation on non-expansible hydrated calcium silicates which have adhesive properties allows for permanent permeability maintenance regardless of subsequent changes of reservoir fluid composition. The adhesive properties of the newly formed compound which adhere together and to the surfaces of larger reservoir particles (substrates) prevent clay migration and pore blockage. Clay volume expansion which, in turn, causes permeability damage and also creates reservoir stresses which tend to destabilize the competency of certain formations is prevented by transforming clays into hydrous calcium silicates.

The invention will now be described by way of examples, it being understood, that these examples are given only for the purposes of illustration and not in any way as a limitation on the inventive procedure.

BRIEF DESCRIPTION OF THE DRAWINGS

FIG. 4 is a graph of the relative permeability of a Berea sand core (No. D-2) which illustrates the permeability protection against fresh water damage that is provided by treatment with a high pH solution of calcium chloride and a reaction period of 24 hours.

EXAMPLES

Figure 1:
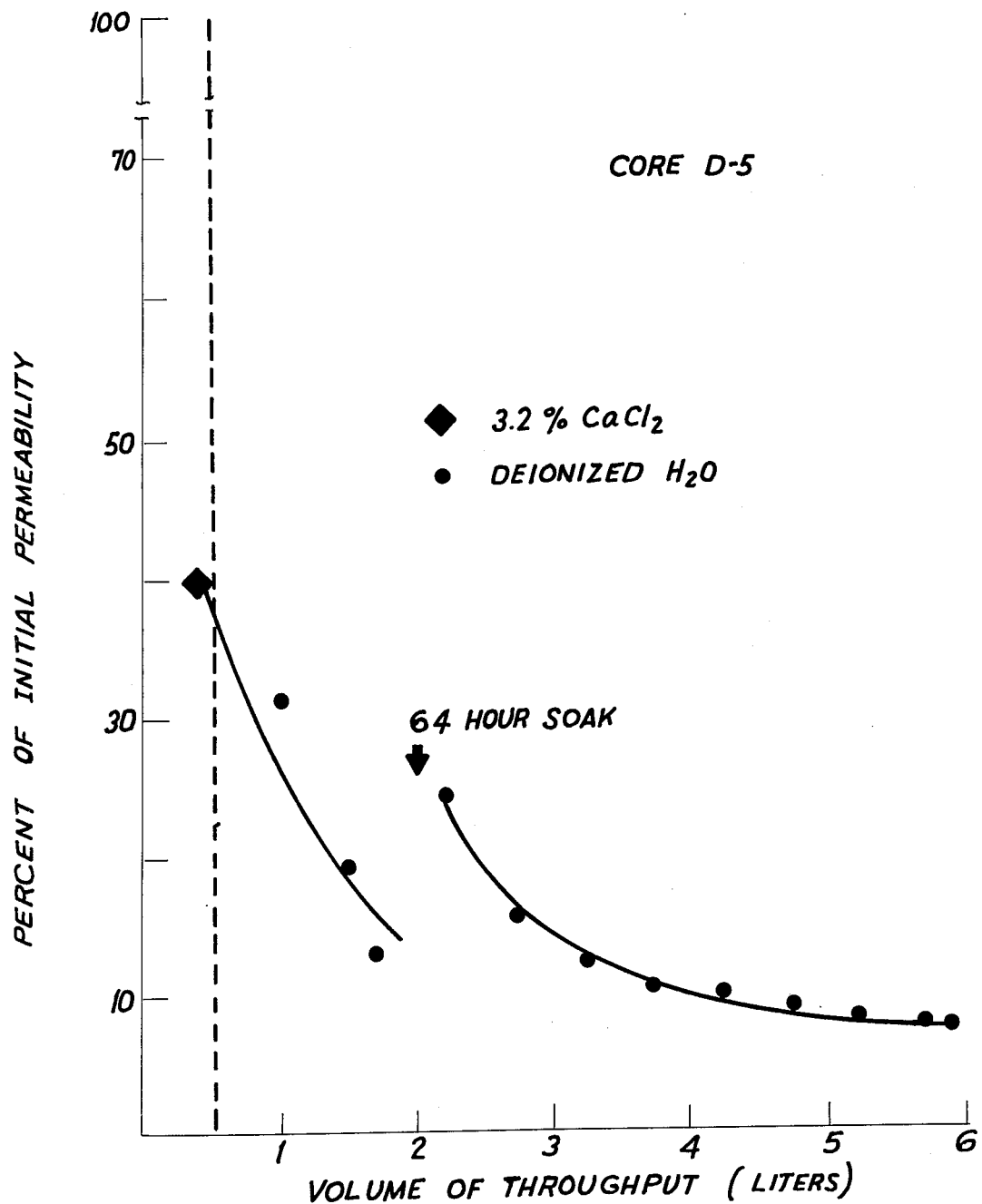
FIG. 1 is a graph of the relative permeability of a Berea sand core (No. D-5) which demonstrates that solutions of $CaCl_2$ provide only temporary protection against clay damage caused by fresh water.
Figure 2:
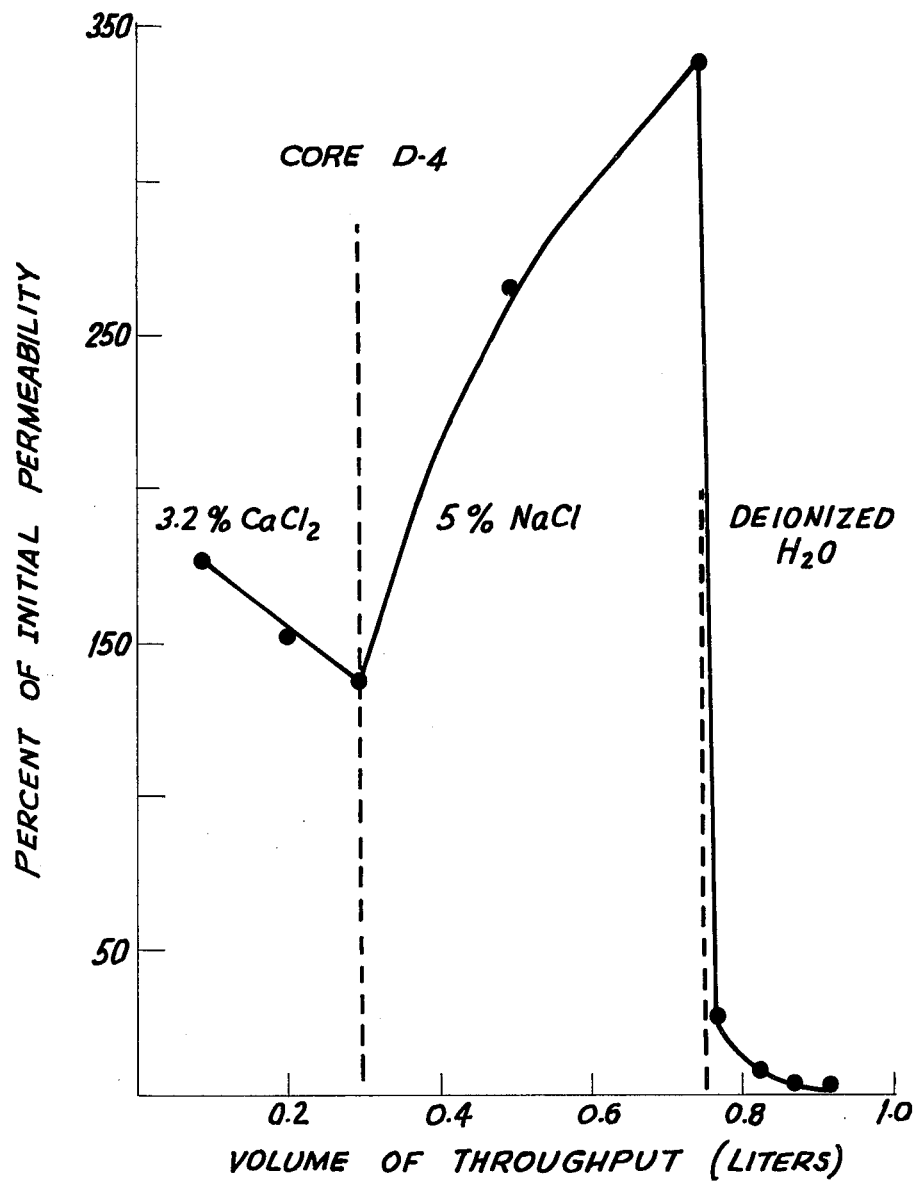
FIG. 2 is a graph of the relative permeability of a Berea sand core (No. D-4) which demonstrates the deleterious permeability effects of fresh water on sodium-saturated clays.

Tests have been conducted in the laboratory to illustrate the advantages of the present invention. Berea sandstone was used as an example of a sandstone reservoir rock, partially because after sodium saturation, this sandstone is very sensitive to fresh water and its composition and physical properties, particularly permeability are quite uniform. According to Reed (U.S. Pat. No. 3,603,399) it has been found that clay particle dispersion and migration are the principal damage mechanisms in Berea sandstone. The Berea sandstone, of lower Mississipian age, has been an important oil producing rock in the Appalachian region.

In the laboratory tests, cores one inch in diameter by 2.6 inches in length were cut from a large piece of Berea sandstone obtained from a surface outcrop near Amherst, Ohio. The cores were supplied by Cleveland Quarries, Amherst, Ohio 44001. The cores were routinely cleaned with toluene to remove any oil which might have been used as a coolant in cutting. The cores were then placed in a specially constructed Hassler-sleeve type device. An hydraulic confining pressure of 500 psi was axially applied to the core and then reduced to 300 psi for the remaining portion of the experimental test. This hydraulic confining pressure may be similar in kind, but not necessarily in magnitude, to naturally occurring overburden or lithostatic pressure.

In each of the tests, approximately 100 ml of a 3.2% by weight solution of calcium chloride was flushed through the core. The purpose of this initial preflush was to saturate the cation exchange sites of clay components with calcium ions and thereby provide for temporary protection against clay damage during the determination of the initial core permeability to deionized (fresh) water. Following the described preflush, the permeability to deionized water was determined by flowing approximately 20 ml through the core. The permeability determined in this manner was considered to be the initial permeability and indicated on the abscissa of FIGS. 1 through 4 as 100% permeability.

The average permeability of Core D-5 (FIG. 1) during the injection of 500 ml of a 3.2% by weight solution of $CaCl_2$ was 39.4% of the initial permeability. Deionized water was then passed through Core D-5 (FIG. 1) with concurrent measurements of the permeability. As expected, the permeability measurements (FIG. 1) confirms that $CaCl_2$ treatments provide only temporary protection against clay damage by subsequent fresh water injection.

The effect of deionized (fresh) water on the permeability characteristics of a core containing sodium-saturated clays was investigated by permeability measurements during the sequential injection through Core D-4 of the following fluids: (a) 300 ml of a 3.2% by weight solution of NaCl; (b) 500 ml of a 5% by weight solution of NaCl; and (c) 125 ml of deionized water. The permeability to deionized water (FIG. 2) indicates the expected drastic permeability reduction due to migration and/or expansion of sodium saturated clays.

Following the injection of a 5% by weight solution of NaCl, Core D-1 (FIG. 3) was treated with an alkaline earth metal hydroxide solution as an example of the teachings and disclosures of this invention. Concurrent permeability measurements were made during the injection of the alkaline earth hydroxide solution and at injection termination, the core was shut-in for a one hour period of contact with the solution entrapped.

The said alkaline earth hydroxide solution may be completely described as being an aqueous solution containing 4.82% by weight $CaCl_2$ and 0.084% by weight NaOH and having a empirical pH of 11.80. The empirical pH is in close agreement with the calculated pH of 11.95. Th calculated specific gravity of this fluid was 1.042. The said alkaline earth hydroxide solution herein disclosed may be also categorized as being a high pH solution of calcium chloride or of other soluble salts of alkaline earth metals.

Figure 3:
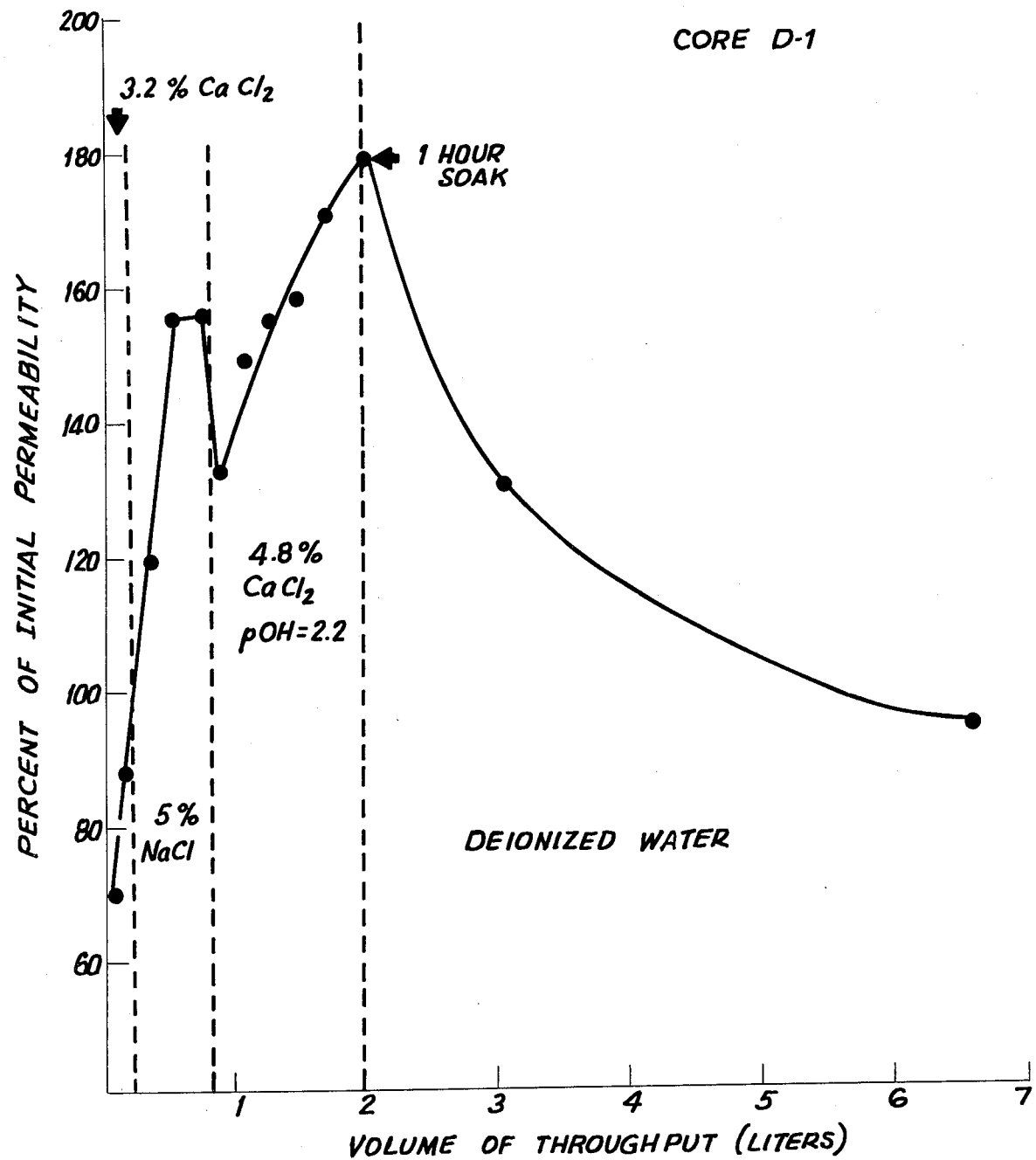
FIG. 3 is a graph of the relative permeability of a Berea sand core (No. D-1) which illustrates the permeability protection against fresh water damage that is provided by treatment with a high pH solution of calcium chloride and a 1 hour reaction period.

Following the one hour shut-in period, deionized water was injected into Core D-1 with concurrent measurement of permeability. The individual permeability measurements collected during the injection of 4.5 liters of dionized water are plotted on FIG. 3 as weighted averages for the indicated cumulative volume of water. After the passsage of 4.5 liters of deionized water the core retained approximately 97% of the initial permeability (FIG. 3). Assuming that the Berea sandstone has a porosity of 25% or 6.6 cc, approximately 682 pore volumes of fresh water was passed through the core without substantial damage to the permeability. Such a finding, in comparison with the results previously discussed for Core D-5 (FIG. 1) and Core D-4 (FIG. 2), is in accordance with the chemical concepts previously discussed and is a substantiation of this invention. These results (FIG. 3) indicate that lengthy and prolonged periods of contact with the alkaline earth hydroxide solution are not required and that of the desired reactions occur within minutes. This observation was fully anticipated on the basis of previously discussed chemical reactions which are believed to be occurring. This finding is particularly important, as treated wells may be placed back on production within a few hours, or even immediately, following the injection of the alkaline earth hydroxide solution.

The experimental procedure used for Core D-1 was repeated with Core D-2 (FIG. 4). However, the shut-in period of contact with the alkaline earth hydroxide solution was increased from 1 hour to 24 hours. The permeability of the core to deionized water was then determined. Again, the permeability results (FIG. 4) indicated that the method disclosed in this invention provides for protection against permeability damage caused by the swelling (expansion) and/or migration of clay particles thereby providing for a method of permeability maintenance or stabilization and even (FIG. 4) permeability improvement.

It will be appreciated from the above that the solution is forced under pressure out into the reservoir rock formation and away from said well bore and the pressure is maintained to prevent the solution from flowing back into the well bore and to cause the solution to remain within the rock formation for a time period and with a volume which is:

a. insufficient to consolidate sand, but
b. sufficient
  i. in respect of expansible clay particles, to alter their electrical behavior, thereby causing them, in hydrated form, to occupy a smaller effective volume than prior to the altering, and
  ii. in respect on non-expansible clay particles and originally expansible clay particles whose electrical behaviour has thus been altered pursuant to (i), chemically to transform them into clay particles which are capable of permanently adhering to rock substrates, thereby decreasing the existing sensitivity of both expansible and non-expansible clay particles to fluids and permanently changing the clay particle structure so as to prevent future sensitivity to fluids. The well head pressure is then released, thereby enabling solution to flow back into the well bore.

I claim:

1. A method of maintaining and stabilizing the permeability of subsurface hydrocarbon reservoir rock containing clay particles and, where clay damage has occurred, of improving the permeability of the rock, said method comprising:
  a. injecting down a well bore traversing said rock an aqueous solution of alkaline earth metal hydroxide and a salt of an alkaline earth metal the concentration of alkaline earth metal cation in the solution being greater than 10,000 ppm and the pH value of the solution being greater than 10;
  b. forcing said solution under pressure out into the reservoir rock formation and away from said well bore;
  c. maintaining the pressure to prevent the solution from flowing back into the well bore and to cause the solution to remain within the rock formation for a time period and with a volume which is:
    1. insufficient to consolidate sand, but
    2. sufficient
      i. in respect of expansible clay particles to alter their electrical behavior, thereby causing them, in hydrated form, to occupy a smaller effective volume than prior to the altering, and
      ii. in respect of non-expansible clay particles and originally expansible clay particles whose electrical behavior has thus been altered pursuant to (i), chemically to transform them into clay particles which are capable of permanently adhering to rock substrates, thereby to decrease the existing sensitivity of both expansible and non-expansible clay particles to fluids and permanently to change the clay particle structure so as to prevent future sensitivity of fluids
  d. thereafter releasing the well head pressure, thereby enabling solution to flow back into the well bore.

2. A method as claimed in claim 1, wherein said rock is selected from the group consisting of indurated siltstone, unconsolidated sand, calcitic limestone, dolomitic limestone and conglomerates thereof.

3. A method ad claimed in claim 1, wherein said solution is injected into said well bore at ambient temperature.

4. A method as claimed in claim 1, wherein said solution is forced into the reservoir rock formation and away from said well bore to a radial extent which is greater than that which is obtained by penetration of solution during well completion and work-over operations.

5. A method as claimed in claim 1, wherein said alkaline earth metal hydroxide is calcium hydroxide, while the soluble salt of alkaline earth metal is calcium chloride.

6. A method as claimed in claim 1, wherein said alkaline earth metal cation is selected from the group consisting of calcium, magnesium, strontium and barium.

7. A method as claimed in claim 1 for enhancing the effectiveness of well completions using slotted liners, screens, gravel packs or open holes.

8. A method as claimed in claim 1 for enhancing the effectiveness of wells completed with plastic and other artificial sand consolidation treatments.

9. A method as claimed in claim 1, wherein said rock formation is water sensitive.

10. A method as claimed in claim 1, wherein the formation is first acid treated whereafter said method is carried out for the prevention of the migration of formation particles following said acid treatment.

11. A method as claimed in claim 1, wherein first hydraulic, explosive, long burn gas expansion or nuclear fracturing treatment is carried out, whereafter said method is employed.

* * * * *